United States Patent [19]

Logan

[11] 4,294,512
[45] Oct. 13, 1981

[54] OPTOELECTRONIC INTERFACE APPARATUS

[75] Inventor: Maurus C. Logan, Elizabeth, N.J.

[73] Assignee: Thomas & Betts Corporation, Raritan, N.J.

[21] Appl. No.: 111,943

[22] Filed: Jan. 14, 1980

[51] Int. Cl.³ .............................................. G02B 5/14
[52] U.S. Cl. ................... 350/96.20; 250/227; 339/17 LC
[58] Field of Search ............ 350/96.20; 250/227, 250/551; 357/17, 18, 19, 72; 339/17 LC

[56] References Cited

U.S. PATENT DOCUMENTS

| | | | |
|---|---|---|---|
| 3,792,284 | 2/1974 | Kaelin | 350/96.20 |
| 4,118,100 | 10/1978 | Goell et al. | 350/96.20 |
| 4,186,996 | 2/1980 | Bowen et al. | 350/96.20 |
| 4,199,222 | 4/1980 | Ikushima et al. | 350/96.20 |

OTHER PUBLICATIONS

F. Cefarelli et al., "Optical Circuit Module Connector," IBM Tech. Disc. Bulletin, vol. 21, No. 4, Sep. 1978, pp. 1568-1570.

Primary Examiner—Stewart J. Levy
Attorney, Agent, or Firm—Robert M. Rodrick; Jesse Woldman

[57] ABSTRACT

In interfacing electronic and optical components, a housing fixedly supports a female electrical contact therein, remote from a housing entry aperture. A fiber optic assembly includes a fiber, a transducer terminating the fiber and a ferrule securing the fiber to the transducer. The transducer has a male electrical contact matable with the housing female contact and the fiber optic assembly is configured to pass freely through the housing entry aperture to mate the contacts, thereby providing any desired length of electromagnetic radiation-free path within the housing.

11 Claims, 3 Drawing Figures

OPTOELECTRONIC INTERFACE APPARATUS

FIELD OF THE INVENTION

This invention relates to optoelectronic apparatus and pertains more particularly to apparatus for interfacing optical and electronic circuitry.

BACKGROUND OF THE INVENTION

In interfacing optical and electronic circuitry, the art has looked to separability of connection in various ways and has typically attained this function by providing a separable optical interface through releasable light-conducting components. As these practices have been implemented by connectors, splices, and the like, they have shown in common a requirement for alignment of optical fibers through separable release, or alignment of an optical fiber and the active area of an emitter or detector, again through separability. The transmission loss characteristics of optically separable arrangements have frequently not satisfied demands, absent quite careful adjustment on an individual basis.

An alternative to optical separability in optoelectronic systems is to rely on electrical separation, in which case the system optical links and interfaces with transducers may be rendered permanent during use. Apparatus of this general character heretofore known has not met application requirements, particularly with respect to maximizing transmission path length free from electromagnetic radiation (EMR) interference.

SUMMARY OF THE INVENTION

The present invention has as its principal object the provision of improved optoelectronic interface apparatus.

A more particular object of the invention is to provide optoelectronic interface apparatus having enhanced electromagnetic radiation-protected circuit extent.

In attaining the foregoing and other objects, the invention provides optoelectronic apparatus and system inclusive of a housing having an upstanding wall defining an entry aperture, the housing supporting a disconnectable (disconnect) electrical contact interiorly of the housing and remotely located with respect to the wall. A fiber optic assembly is provided including a fiber optic cable and a transducer for converting between light and electrical energy and situated in registry with the cable. The assembly has a disconnect electrical contact and ferrule means which secures the cable to the transducer. The fiber optic assembly is of cross-section less than the cross-section of the housing entry aperture. Accordingly, the fiber optic assembly may be inserted through the entry aperture and the disconnect contact of the fiber optic assembly may be coupled to the disconnect contact of the housing at the remote support location of the latter within the housing. As will be noted in detail hereinafter, a path length which is free of electromagnetic radiation influence and interference, i.e., a light energy path, extends interiorly of the housing to the support location of the housing disconnect contact.

In a particularly preferred embodiment of the invention, the housing disconnect contact is supported on a printed circuit board and the printed circuit board includes card edge contacts. Disconnect contact means are included within the housing for connection with the card edge contacts and both the fiber optic assembly disconnect contact and the card edge disconnect contact means are jointly separable from the printed circuit board. In this embodiment, the light transmissive path and the card edge contact path are mutually separable along an electrical interface.

The foregoing and other objects and features of the invention will be evident from the following detailed description of preferred embodiments of the invention and from the drawings wherein like reference numerals are used to identify like parts throughout.

DESCRIPTION OF THE PREFERRED EMBODIMENTS

Figure 1:
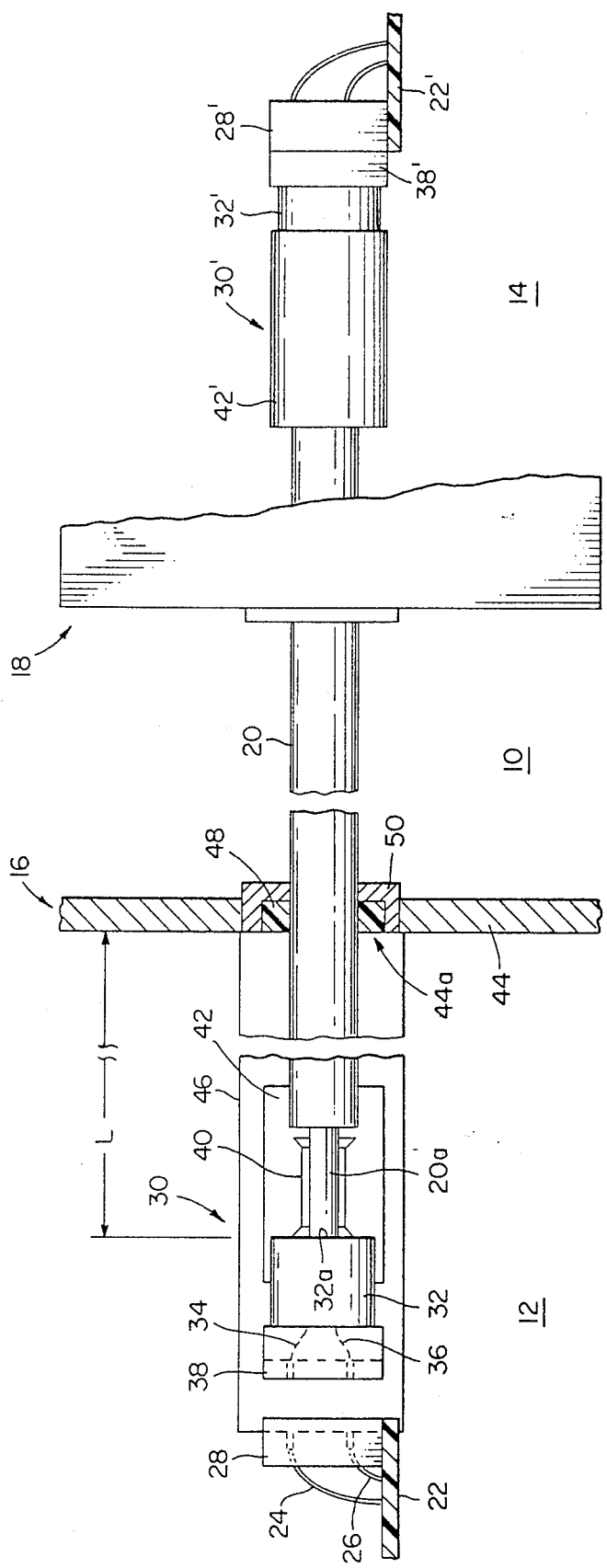
FIG. 1 is a schematic diagram of an optoelectronic communication system in accordance with the invention.

Referring to FIG. 1, optoelectronic communication system 10 includes transmitting station 12 and receiving station 14, disposed respectively in housings 16 and 18. Fiber optic cable 20 extends between the stations and, for purposes discussed below, also extends interiorly of the housings.

Considering transmitting station 12, transmitter electrical signal-generating circuit components (not shown) may be situated on printed circuit board (PCB) 22 and the generated signals are conducted by leads 24 and 26 to female disconnect contact 28, fixedly mounted on PCB 22.

Fiber optic cable terminating assembly 30 includes a transducer 32, typically a light-emitting diode (LED) or other semiconductor component having an active surface area on flat surface 32a. LED 32 has its input/activating leads 34 and 36 connected to male disconnect contact 38, which is configured to seat within female disconnect contact 28. Guide tube 40 is secured within assembly 30 to receive core 20a of cable 20 and seat the core in registry with the active surface area of LED 32. Such optical interface, i.e., the interface of core 20a and the active area of LED 32, is desirably rendered non-disconnect or inseparable by the provision of a bonding agent on LED surface 32a, and further by crimping or other fixed securement of LED 32 to the protective casing 20b of cable 20 by ferrule 42.

Transmitting station housing 16 has forward wall 44 defining an opening 44a of cross-sectional expanse having dimension exceeding that of assembly 30, particularly that of ferrule 42, whereby the entirety of assembly 30 may be inserted, while assembled with cable 20, from the exterior of housing 16 into the interior thereof. A flexible conduit or duct 46 may be provided, as desired to guide assembly 30 into registry with disconnect contact 28.

By the provision of an inseparable optical interface through assembly 30, one achieves and maintains fixed optical registration, once established. Further, by providing a separable electrical interface through disconnect contacts 28 and 38, distal from housing front wall 44, one realizes an extended path within housing 16 which is EMR-free, i.e., is isolated from electromagnetic radiation, since optical path length L extends interiorly of housing 16. Where duct 46 is formed of telescopic sections, is accordion pleated or is bellow-configured, EMR-free path is variable at user option.

In providing strain relief for cable 20 and in safeguarding against inadvertent interruption of electrical interface continuity, use may be made of grommet 48 which compresses against casing 20b on threaded engagement of grommet seat 50 in housing wall 44. In disconnect operation, one withdraws grommet seat 50 from wall 44 and pulls cable 20 out of the housing. Conversely, to connect, cable 20 is inserted in the housing until contacts 28 and 38 are engaged and seat 50 is then engaged in wall 44.

While the optical interface has been characterized as "inseparable", what is meant is inseparability in the course of use. On the other hand, separability of the optical interface is contemplated for replacement of components. Thus, it is anticipated that ferrule 42 may be uncrimped and released should transducer 32 fail and need to be replaced.

Turning to receiving station housing 18, cable 20 terminates in an inseparable optical interface in fiber optic assembly 30' (primed numbers having counterpart structure to the transmitting station reference numerals) which typically houses a transducer 32' and a semiconductor component of photoconductive nature, e.g., a PIN diode. Male disconnect contact 38' is secured to transducer 32' and ferrule 42' secures cable 20 to transducer 32' and receptacle 38'. Femal disconnect contact 28' is seated upon PCB 22' and provides, with receptacle 38', a separable electrical receiver interface counterpart to that of transmitter station 12'.

Figure 2:
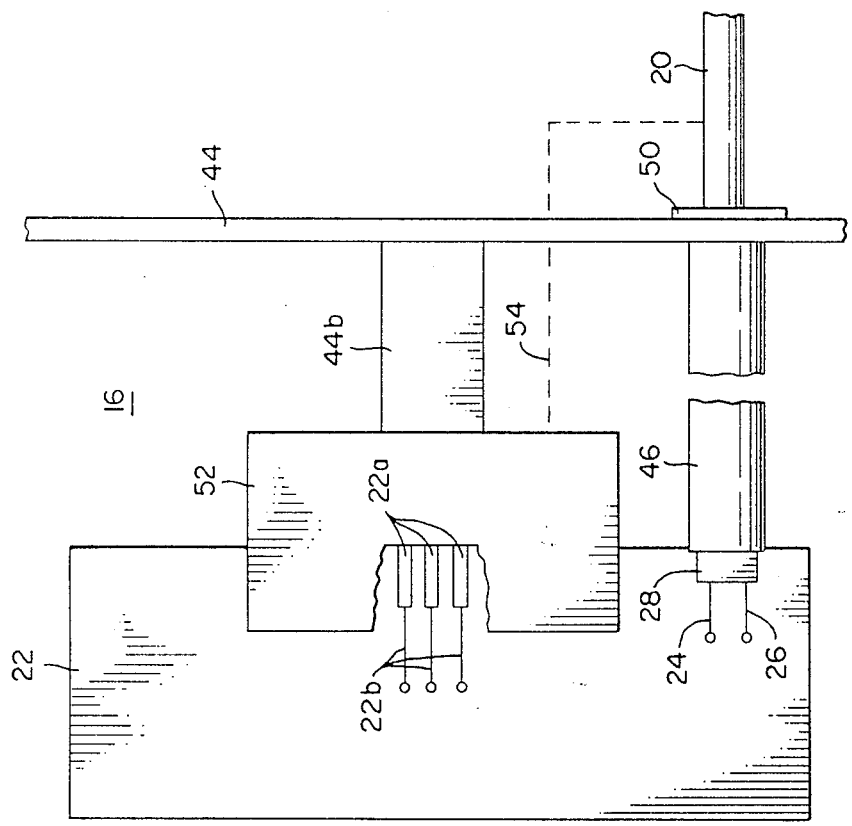
FIG. 2 is a plan elevation of the FIG. 1 schematic, indicating the joint card edge and fiber optic assembly embodiment of the invention.

Referring to FIG. 2, PCB 22 is shown as including contacts of card-edge type, denoted as 22a, with conductors 22b extending therefrom. Housing 44 includes flange 44b supporting a card edge disconnect contact means 52, which includes female contacts for engagement with card edge contacts 22a. The arrangement of contacts 22a with disconnect contact 28 is such that on withdrawal of PCB 22 from both duct 46 and connector 52, a joint separation is provided both of the electro-optical link through cable 20 and of the electrical link through card edge contacts 22a. As will be appreciated, various arrangements may be provided for joint withdrawal of cable 20 and movement of connected 52 away from PCB 22, a mechanical link being indicated schematically at 54 for mutual fixed support thereof.

Figure 3:
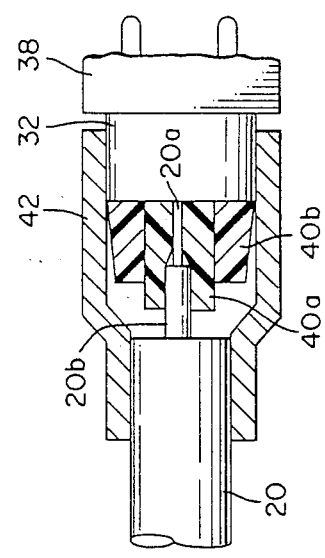
FIG. 3 is a side elevation, partly in section, of a fiber optic assembly employed in the transmitting station of the FIG. 1 system.

In FIG. 3, the structural details of a preferred embodiment of fiber optic assembly 30 of FIG. 1 are shown, inclusive of cable 20, buffer 20b and cable core 20a, transducer 32, disconnect contact 38 and ferrule 42. The ferrule is crimped upon cable 20 and transducer 32. Guide tube 40 (FIG. 1) includes an annular member 40b which may be bonded to transducer 32 and an interior member 40a which is joined to buffer 20b by suitable bonding agent and is registerable within guide tube member 40b.

In its several aspects, the invention will be seen to encompass optoelectronic apparatus and system inclusive of a path, extending interiorly of one or both of such as transmitting and receiving stations, of electromagnetic radiation free character, and PCB apparatus in either of such as transmitting or receiving stations of type providing separability in joint fashion of both optoelectronic and electrical links.

While the invention has been disclosed by way of particularly disclosed preferred embodiments, various modifications will not be evident to those skilled in the art. Accordingly, the preferred embodiments are intended in an illustrative and not in a limiting sense. The true spirit and scope of the invention is set forth in the following claims:

What is claimed is:

1. Optoelectronic apparatus comprising a housing having an upstanding wall defining an entry aperture, said housing supporting a first disconnect electrical contact distal from said wall and interiorly of said entry aperture, and a fiber optic assembly including a fiber optic cable, transducer means for conversion between light and electrical energy in registry with said cable, a second disconnect electrical contact coupled to said transducer means and configured to couple to said first disconnect electrical contact, and ferrule means for securing said cable and said transducer means to one another, said fiber optic assembly being of cross-section less than the cross-section of said entry aperture, whereby said fiber optic assembly is insertable through said entry aperture and said second disconnect contact may be coupled to said first disconnect contact within said housing remotely from said entry aperture.

2. The apparatus claimed in claim 1 further including guide duct means for said fiber optic assembly, said guide duct means extending interiorly of said housing from said housing wall to said first disconnect electrical contact.

3. The apparatus claimed in claim 1 further including means releasably securable to said cable and seatable in said entry aperture for providing strain relief for said cable.

4. The apparatus claimed in claim 1 wherein said ferrule means engages exterior surface of said cable and exterior surface of said transducer means.

5. The apparatus claimed in claim 1 wherein said transducer means is responsive to electrical input signals conducted through said first and second disconnect electrical contacts for generating output light energy and applying same to said cable.

6. The apparatus claimed in claim 1 wherein said transducer means is responsive to light energy in said cable for generating electrical signals for conduction through said first and second disconnect electrical contacts.

7. The apparatus claimed in claim 1 wherein said housing includes printed circuit board means for supporting said first disconnect electrical contact.

8. The apparatus claimed in claim 7 wherein said printed circuit board means includes card edge contacts, said apparatus including further disconnect contact means for said card edge contacts.

9. The apparatus claimed in claim 8 wherein said first disconnect electrical contact and said card edge contacts are jointly separably related respectively with said second disconnect electrical contact and said disconnect contact means.

10. The apparatus claimed in claim 9 including support means for supporting said disconnect contact means fixedly with said fiber optic assembly.

11. The apparatus claimed in claim 1 wherein said second disconnect electrical contact is supported by said transducer means.

* * * * *